(12) United States Patent
Irle et al.

(10) Patent No.: US 6,480,805 B1
(45) Date of Patent: Nov. 12, 2002

(54) POSITIONING SENSOR FOR A MOTOR VEHICLE

(75) Inventors: Henning Irle, Lippstadt; Norbert Kost, Geseke; Franz-Josef Schmidt, Salzkotten, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 58 days.

(21) Appl. No.: 09/654,060

(22) Filed: Sep. 1, 2000

(30) Foreign Application Priority Data

Sep. 1, 1999 (DE) .......................................... 199 41 465

(51) Int. Cl.⁷ .............................. G01B 7/02; G01B 7/30
(52) U.S. Cl. .................. 702/150; 324/676; 324/207.25
(58) Field of Search ................................ 324/676, 678, 324/679, 609, 207.25; 702/150

(56) References Cited

U.S. PATENT DOCUMENTS

| | | |
|---|---|---|
| 4,065,715 A | 12/1977 | Jaffe et al. |
| 5,481,141 A | 1/1996 | Brown et al. |
| 5,585,733 A | 12/1996 | Paglione |
| 6,384,598 B1 * | 5/2002 | Hobein et al. ......... 324/207.17 |

FOREIGN PATENT DOCUMENTS

| | | |
|---|---|---|
| DE | A1-3618891 | 12/1987 |
| DE | C2-3701082 | 3/1989 |
| DE | 4215315 C | 9/1993 |
| DE | C1-3891423 | 1/1997 |
| DE | A1-19823957 | 12/1998 |
| EP | 0260531 A | 3/1988 |
| EP | A1800059 | 10/1997 |
| EP | 0814247 A | 12/1997 |
| EP | A1-19738841 | 3/1999 |
| GB | A2248302 | 4/1992 |

\* cited by examiner

*Primary Examiner*—Kamini Shah
(74) *Attorney, Agent, or Firm*—Birch, Stewart, Kolasch & Birch, LLP

(57) ABSTRACT

A position sensor for a motor vehicle is described which, as its sensor signal, generates several pulse-width modulated signals that vary as a function of position. The position sensor transmits individual sensor signals in a defined sequence of consecutive individual pulses over the same output line to a receiver. The individual sensor signals are each encoded in the duty factor of a pulse. Therefore, the position sensor has a signal transmission system that is simple and inexpensive to implement. Particularly advantageous is the characteristic that it is possible to avoid an interconnection of the position sensor to a bus system.

10 Claims, 1 Drawing Sheet

POSITIONING SENSOR FOR A MOTOR VEHICLE

BACKGROUND OF THE INVENTION

This application claims a priority based on German application 199 41 465.3 filed Sep. 1, 1999, and the contents of that application are incorporated herein by reference.

1. Field of the Invention

The present invention relates to position sensors for a motor vehicle, and more particularly, to position sensors which generate, as sensor signals, several pulse-width modulated signals that vary as a function of position.

2. Related Art

A position sensor relating to the Field of the Invention is disclosed in document DE 197 38 841 A1. The position sensor represented in that document exhibits two measuring systems that function independently of each another, and which to enhance safety (redundant sensor) generate two pulse-width modulated signals that vary as a function of position.

Position sensors incorporating several differently constructed position sensors which generate pulse-width modulated signals that vary as a function of position can, compared to singular position sensors, achieve a significantly higher degree of resolution and measuring accuracy.

The transmission of signals from the position sensor as the sender to a receiver can occur over a bus system, e.g. a CAN bus system that is used extensively in motor vehicles. This requires a microprocessor with a crystal oscillator, a CAN module, a CAN driver as well as a CAN choke. This is expensive and introduces additional problems such as radiated interference, mounting space requirements, etc.

Furthermore, it is disadvantageous to have real-time controllers with short control cycle times and high data rates which load the CAN bus at unacceptably high levels. This problem is further intensified if signals with high resolution (more bits) must be transmitted, possibly even redundantly for safety reasons. This results in unpredictable signal delays on the bus which adversely influence the control properties.

SUMMARY OF THE INVENTION

Therefore, it is an object of the invention to provide an uncomplicated and inexpensive position sensor which generates, as its sensor signal, several pulse-width modulated signals that vary as a function of position and transmits these to a receiver thereby avoiding the disadvantages indicated hereinabove.

The invention achieves this object and additional objects of the present invention in that the position sensor transmits the individual sensor signals in a defined sequence of consecutive individual pulses over the same output line to a receiver, wherein each of the sensor signals is encoded in the duty factor of a pulse.

Moreover, by this means the position sensor of the invention transmits its signals, independent of a bus system, as a sequence of pulse-width modulated signals. In such a transmission system it is simple and inexpensive to add the circuit of the position sensor which is advantageously constructed as an Application Specific IC (ASIC).

The individual measured values of different signal sources are transmitted, one after another, with one pulse per measured value of a signal source, whereby the information is contained in the duty factor of the pulse. The sequence of the signals is known to the receiver.

Various methods are described hereinafter for achieving the necessary synchronization. For example, a control line can be provided for synchronization. But the synchronization could also be performed directly via the output line over which the signals are transmitted. In this case it is useful to provide a signal transmission method which limits the modulation bandwidth of the pulse-width modulated signals. A position sensor that implements such a method is described in the undisclosed German patent application DE 199 27 152. In this way the control signals can be represented at modulation depths which lie outside of the limited modulation bandwidth for the sensor signals.

In addition, the objects of the present invention are achieved with a position sensor for a motor vehicle which generates, as its sensor signal, several pulse-width modulated signals that vary as a function of position, wherein the position sensor transmits individual sensor signals in a defined sequence of consecutive individual pulses over the same output line to a receiver, and wherein the sensor signals are each encoded in the duty factor of a pulse.

Additionally, the position sensor includes a control line to the receiver over which control and synchronization of the individual sensor signals are performed.

Furthermore, the position sensor also transmits signals for control and synchronization over the output line.

Moreover, a total measuring range of the position sensor is subdivided into several sequentially adjacent measuring sections, and wherein the position sensor adds a fixed offset value to a digitalized measured value with the sum of a minimum possible measured value and the offset value corresponds to a pulse-width modulated signal with a minimum modulation depth greater than 0%, and a sum of the maximum possible measured value and the offset value corresponds to a pulse-width modulated signal with a maximum modulation depth less than 100%.

Furthermore, the signals for control and synchronization of the signal transmission exhibit a modulation depth that lies between 0% and a minimum modulation depth used to transmit measured values and/or between a maximum modulation depth used to transmit measured values and a modulation depth of 100%.

Additionally, in the position sensor control between the position sensor and the receiver is bi-directional.

Still further, the position sensor can be switched via a control line or via the output line to another operating mode (e.g. Test mode, Sleep mode).

Additionally, a supply line of the position sensor simultaneously functions as a signal output line, or the control line simultaneously functions as a supply line of the position sensor.

Furthermore, the position sensor comprises several different position sensors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described and explained in more detail below using embodiments shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1A:
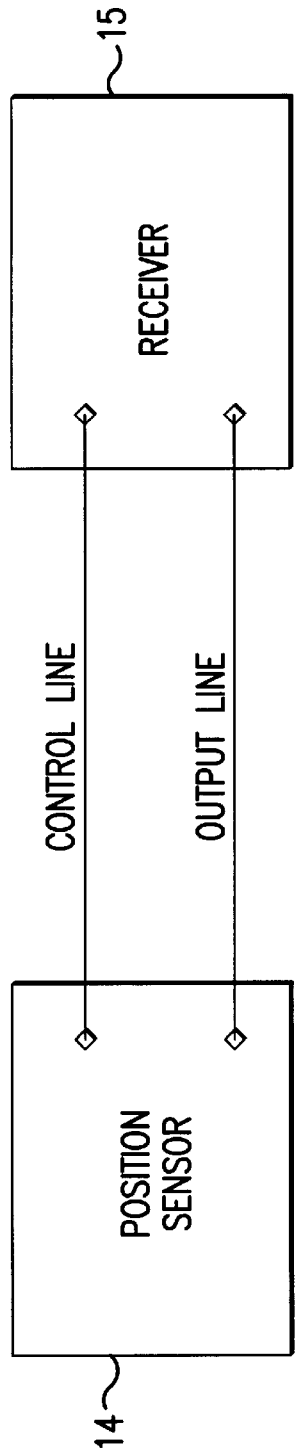
FIGS. 1(a) and 1(b) illustrate the arrangement of a position sensor and a receiver according to the present invention.
Figure 1B:
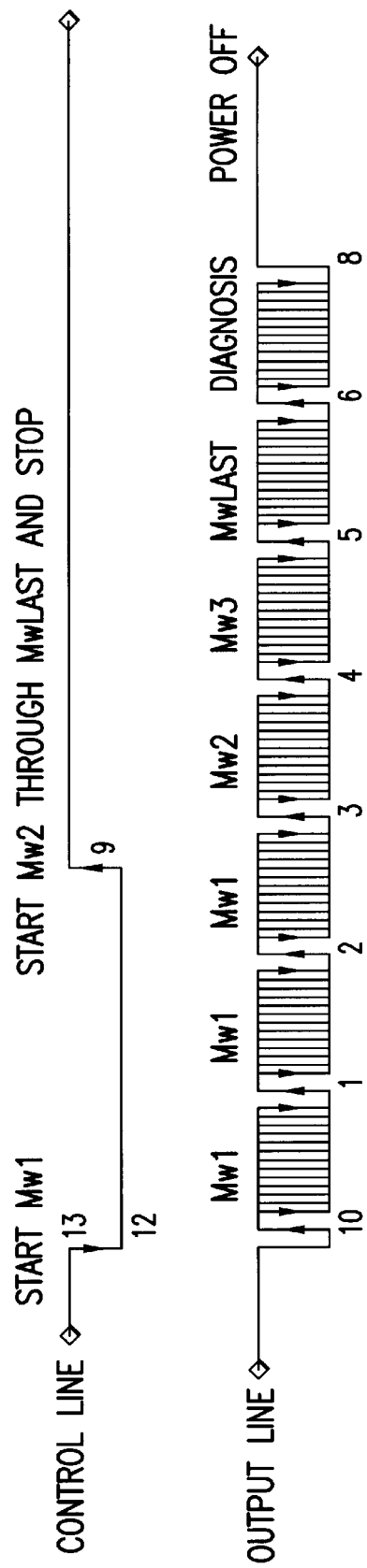

FIGS. 1(a) and 1(b) illustrate the arrangement of a position sensor and a receiver, which are interconnected via an output line and a control line (a), and it shows a signal response over the lines interconnecting the position sensor and a receiver (b).

As long as the control line is at a LOW level, the measured value Mw1 is transmitted cyclically (normal operation). After a transition to a HIGH level, Mw2, Mw3, MwLOAD and a diagnostic value (Diagnostics) are transmitted once. Afterwards, the position sensor goes into a Sleep mode (POWER OFF).

The position sensor can be awakened by the next HIGH/LOW edge on the control line. It then transmits the measured value Mw1 cyclically until the next LOW/HIGH edge occurs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Position sensor for a motor vehicle which generates, as its sensor signal, several pulse-width modulated signals that vary as a function of position, wherein the position sensor transmits individual sensor signals in a defined sequence of consecutive individual pulses over the same output line to a receiver, wherein the sensor signals are each encoded in the duty factor of a pulse, and wherein a total measuring range of the position sensor is subdivided into several sequentially adjacent measuring sections, and wherein the position sensor adds a fixed offset value to a digitalized measured value with the sum of a minimum possible measured value and the offset value corresponds to a pulse-width modulated signal with a minimum modulation depth greater than 0%, and a sum of the maximum possible measured value and the offset value corresponds to a pulse-width modulated signal with a maximum modulation depth less than 100%.

2. Position sensor as set forth in claim 1, wherein the position sensor includes a control line to the receiver over which control and synchronization of the individual sensor signals are performed.

3. Position sensor as set forth in claim 1, wherein the position sensor also transmits signals for control and synchronization over the output line.

4. Position sensor as set forth in claim 3, wherein the signals for control and synchronization of the signal transmission exhibit a modulation depth that lies between 0% and a minimum modulation depth used to transmit measured values and/or between a maximum modulation depth used to transmit measured values and a modulation depth of 100%.

5. Position sensor as set forth in claim 1, wherein control between the position sensor and the receiver is bi-directional.

6. Position sensor as in claim 1, wherein the position sensor can be switched via a control line or via the output line to another operating mode.

7. Position sensor as in claim 1, wherein a supply line of the position sensor simultaneously functions as a signal output line, or the control line simultaneously functions as a supply line of the position sensor.

8. Position sensor as in claim 1, wherein the position sensor is constructed as an ASIC.

9. Position sensor as in claim 1, wherein the position sensor comprises several different position sensors.

10. Position sensor for a motor vehicle, which generates, as its sensor signal, several pulse-width modulated signals that vary as a function of position, wherein the position sensor transmits individual sensor signals in a defined sequence of consecutive individual pulses over the same output line to a receiver, wherein the sensor signals are each encoded in the duty factor of a pulse, wherein the position sensor also transmits signals for control and synchronization over the output line; and wherein the signals for control and- synchronization of the signal transmission exhibit a modulation depth that lies between 0% and a minimum modulation depth used to transmit measured values and/or between a maximum modulation depth used to transmit measured values and a modulation depth of 100%.

* * * * *